United States Patent [19]

Wrobel

[11] Patent Number: 5,013,957
[45] Date of Patent: May 7, 1991

[54] MOTOR WITH TOOTHED DISK TO SECURE THE STATOR CORE

[75] Inventor: Gunter Wrobel, Villingen-Schwenningen, Fed. Rep. of Germany

[73] Assignee: Papst-Motoren & Co., KG, Fed. Rep. of Germany

[21] Appl. No.: 382,628

[22] PCT Filed: Dec. 7, 1988

[86] PCT No.: PCT/EP88/01115
§ 371 Date: Aug. 9, 1989
§ 102(e) Date: Aug. 9, 1989

[87] PCT Pub. No.: WO89/05537
PCT Pub. Date: Jun. 15, 1989

[30] Foreign Application Priority Data
Oct. 12, 1987 [DE] Fed. Rep. of Germany ....... 8716288

[51] Int. Cl.$^5$ .................. H02K 1/06; H02K 11/00; H02K 5/16; H02K 5/00
[52] U.S. Cl. .................. 310/217; 310/67 R; 310/90; 310/91
[58] Field of Search ............. 310/40 MM, 42, 43, 90, 310/91, 217, 218, 67 R

[56] References Cited
U.S. PATENT DOCUMENTS
1,192,404 7/1916 Ewart ..................... 310/217
1,467,938 11/1920 Janette .................... 310/217
4,682,065 7/1987 English et al. ............. 310/67 R FOREIGN PATENT DOCUMENTS
0140102 10/1979 Japan ..................... 310/67 R
0037828 3/1980 Japan ..................... 310/42

Primary Examiner—Steven L. Stephan
Assistant Examiner—C. LaBalle
Attorney, Agent, or Firm—Barnes & Thornburg

[57] ABSTRACT

The invention relates to an electric motor having a fastening flange 10 and a bearing support part 7 made of plastic or a soft metal, the stator 23 of which is fastened on the outer diameter of the bearing support part 7. At the end of the stator iron core 9, which is on the side away from the flange, a toothed disk 24 made of metal is arranged having radially inwardly extending projections 26 which, in external contact with the bearing support part 7, hold the stator 23. The electric motor 1 can preferably be used in fans.

32 Claims, 2 Drawing Sheets

MOTOR WITH TOOTHED DISK TO SECURE THE STATOR CORE

BACKGROUND OF THE INVENTION

The invention relates to an electric motor having a fastening flange and a bearing support part made of a plastic material or a soft metal The motor stator is fastened on an outer diameter of the bearing part.

As a rule, the stators of electric motors of this type are glued on a bearing support part Before the hardening of the adhesive agent of the glue, the stator must be aligned, and it must remain in this position until the hardening is completed. The apportioning of the adhesive agent must take place relatively precisely since, due to the small play between the inside diameter of the stator iron and the outer jacket of the bearing support part, only a small amount of this adhesive agent is required It is an important disadvantage of the adhesive agent that the adhesive layer when, for example the bearing support part is pushed on, is pressed away so that no apportioned amount of adhesive agent remains.

The invention is based on the object of eliminating the disadvantages which arise as a result of the gluing and at the same time reducing the costs for the manufacturing of such electric motors. This is accomplished by means of a very simple mounting.

According to the invention, this object is achieved for an electric motor of the initially mentioned type by arranging a metal toothed disk at the end of the stator iron on the side away from the flange Said toothed disk has radially inwardly extending projections which are in external contact with the bearing support part and hold the stator.

By means of a simple axial pressing-on step, the construction of the inventive stator results in the simultaneous fastening and alignment of the stator at the bearing support part.

The fastening device provided in the invention is a simple toothed disk made of strip steel The equidistantly arranged teeth of the toothed disk are made of thin spring steel or strip steel or hard copper, which is thin, elastic and hard, and which are bent away as a result of a residual spring action to hook themselves in the plastic material of the bearing support part when the stator is pressed on the bearing support part. Because of the selected plate thickness of, for example, approximately 0.2 mm, the teeth do not have to be bent forward and then mounted.

At least one tongue, which projects beyond the outer edge of the toothed disk, fixes this toothed disk in a position which is appropriate for mounting Because of the winding spindle, the teeth should always have the same position.

A groove, which extends in axial direction in the inside bore of the stator iron, acts in conjunction with an axial cam, extending axially on the outer jacket of the bearing support part, to prevent any twisting.

For the radial alignment and improved centering, at least three ribs are injection-molded to the outer jacket of the bearing support part, are approximately uniformly distributed over the circumference, and extend in parallel to the axis of the inside bore of the bearing support part.

The toothed disk is inserted between the stator iron and the end plate of the winding and is held by the winding of the stator and thus also by the end plates of the winding. At the same time, the disk is insulated in the direction of the winding wire.

An axially short smaller diameter of the outer jacket is provided at the end of the bearing support part on the side away from the flange to facilitate the mounting and provide a space for the raising of the teeth.

Other details and advantageous further developments of the invention are found in the following description of the embodiments shown in the drawings.

DETAILED DESCRIPTION OF THE DRAWINGS

Figure 1:
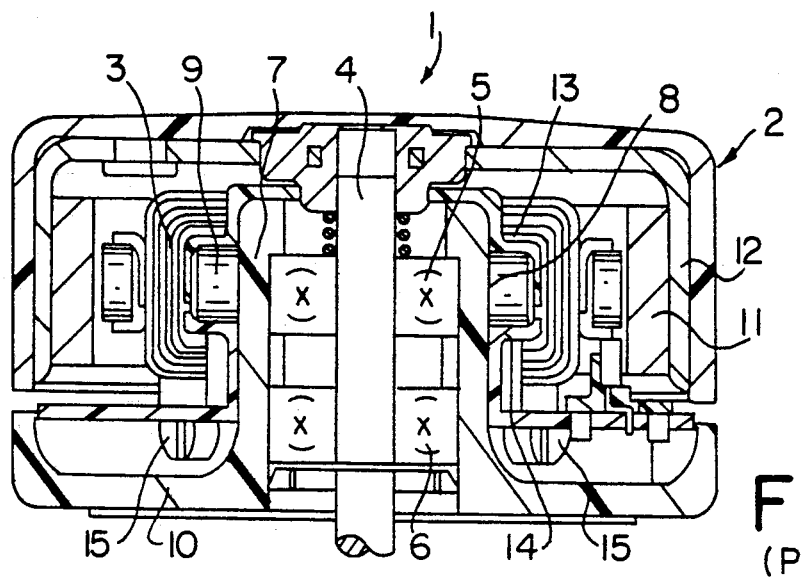
FIG. 1 is a sectional view of a known electric motor.

FIG. 1 shows a known electric motor 1 consisting of a rotor 2 and a stator 3. A shaft 4 is disPosed in bearings 5, 6.

In all embodiments, ball bearings 5 are shown which are fastened in a bearing support part 7 made of plastic or soft metal (diecasting). However, sliding bearings may also be used. An iron core 9 of the stator 3 is glued on an outer jacket 8 of the bearing support part 7. A fastening flange 10 is used for the fastening of the electric motor 1. In the shown example, the bearing support part 7 and the fastening flange 10 are constructed as a one-piece plastic molded part.

The drop-shaped rotor 2 of the collectorless direct-current motor shown consists essentially of a permanent magnet 11 and a return flow pot 12, in the bottom of which, an end of the shaft 4 is concentrically fastened The stator iron core 9, which is constructed as a bundle of plates, is covered on both sides (in axial view) by one winding end plate 13, 14 respectively made of plastic. The lower end plate 14 contains at least three slotted supports 15 which are arranged approximately in parallel with the axis. Among other things, the supports 15 are used for the fastening of a printed circuit board 16 which contains the electronic control system for the operation of the electric motor 1.

Figure 2:
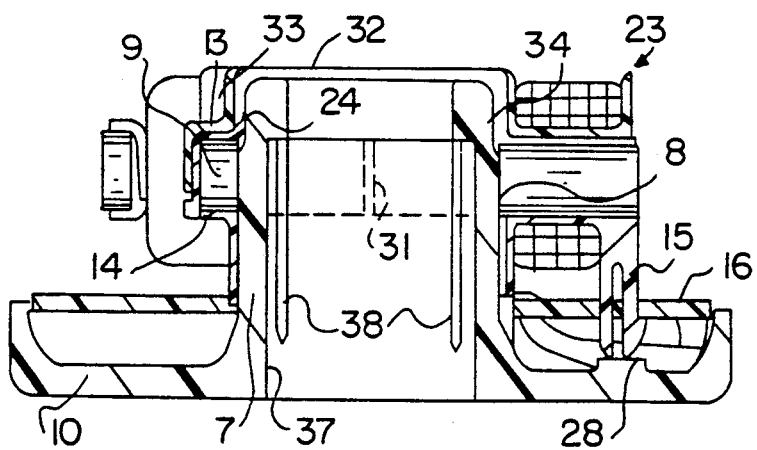
FIG. 2 is a sectional view of a stator for an electric motor according to FIG. 1 mounted according to the invention.
Figure 3:
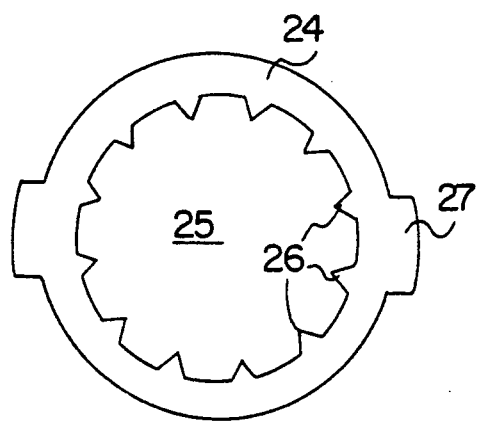
FIG. 3 is a top view of a fastening element used in the invention.

FIG. 2 shows a stator 23, which corresponds essentially to the stator 3 shown in FIG. 1. For this reason identical parts or parts which have the same effect are provided with the same reference numbers. The significant difference are the devices for the fastening of the stator iron 9 on the outer jacket 8 of the bearing suPport Part 7. A toothed disk 24 made of thin spring steel or strip steel with a plate thickness of approximately 0.1 to 0.3 mm and with a central bore 25 is provided with at least three pointed teeth 26 at the inner edge which are arranged and directed radially to the center of the bore. At least one tongue 27 (in the present example, two tongues) is used for the securing of the toothed disk 24. It projects between the fitted-together winding end plates 13, 14. The outer extent of the bore 25 has a somewhat larger diameter than the outer jacket 8 of the bearing support part 7, while the teeth 26, which project radially toward the inside, are equidistantly arranged on the inner edge.

When the stator parts are assembled, the toothed disk 24 is first placed on the one end of the stator iron core 9, the upper winding end plate 13 is fitted over it, and the lower winding end plate 14 is connected with the upper end plate 13 by means of a sliding fit from the direction of the other end of the stator iron 9. Then the stator 23 is wound. The winding firmly connects the two end plates 13, 14 and the toothed disk 24 with one another by means of the end plates 13, 14. Then the mounted stator 23 is slid over the outer jacket 8 of the bearing support part 7 with a slight pressure, until the lower ends of the supports 15 rests against corresponding stop surfaces 28 of the flange 10.

The sliding Pressure is exercised on the upper edge 32 of the upper end plate 13. For reinforcing, at least three ribs 33 are injection-molded on this edge 32 to provide for stiffening. When the stator 23 is pushed on, the teeth 26 of the toothed disk 24, which preferably consist of spring steel or strip steel with a thickness of 0.2 mm, are bent away and, after the pressing-in operation is completed, dig themselves into the outer jacket 8 of the bearing support part 7 made of a plastic material or a soft metal, as a result of the spring-back effect generated during the bending-away. This simple and secure fastening for a stator on a supporting part is not limited to supporting parts 7 made of a plastic material, but can be used anywhere where the supporting part 7 consists of a softer material than the toothed disk 24; i.e., of a material into which the toothed disk can penetrate at least slightly. Examples of such materials are "Zamak" (an aluminum alloy produced by die casting such as $ZnAl_4$) or aluminum.

An axial pressure is generated from above which affects the inside diameter area of the bundle of plates of the stator iron 9. The counterpressure from below takes place at the outer diameter area of the bundle of plates of the stator iron 9 since the supports rest against the stop surfaces 28. The spring-back force of the bundle of plates of the stator iron core 9, which are bent slightly downward at the inside diameter area, seeks to return into a starting position and, as a result, additionally presses the teeth 26 of the disk 24 essentially in axial direction into the outer jacket 8 and thus prevents any axial play.

For simplifying the mounting, the outer jacket 8 of the bearing support part 7, at its upper end (FIG. 2), i.e., on the side facing away from the flange, has an axially short area 34 of a smaller diameter.

As a result, the stator 23, without tilting, can be fitted on without any effort and subsequently can be pushed onto the precisely fitting outer jacket part 8 of the bearing support Part 7. For the circumferential fixing and for preventing twisting, an axially extending groove 31 is provided in the inner bore of the stator iron core 9 and a correspondingly adapted axial cam 35 (FIG. 5) is provided on the outer jacket 8.

The short area 34 of a smaller diameter at the outer jacket 8 of the bearing support part 7 will not be necessary, however, if the clearance between the inside diameter of the end plate 13 and the diameter of the outer jacket 8 is large enough to ensure a bending of the teeth 26 of the toothed disk.

The slightly conical shape of the outer jacket 8 of the bearing support part 7 caused by manufacturing is eliminated by at least three ribs 36 (FIG. 5) which are parallel to the axis of the bearing support 7 and which are molded on and distributed over its circumference. This further improves the centering and the alignment of the stator 3, 23 with respect to the bearing bore 37 Ribs 38, which are parallel to the axis and center the bearings 5, 6 to be inserted, are injection-molded on also at the wall of the bearing bore 37 which is made conical.

Figure 4:
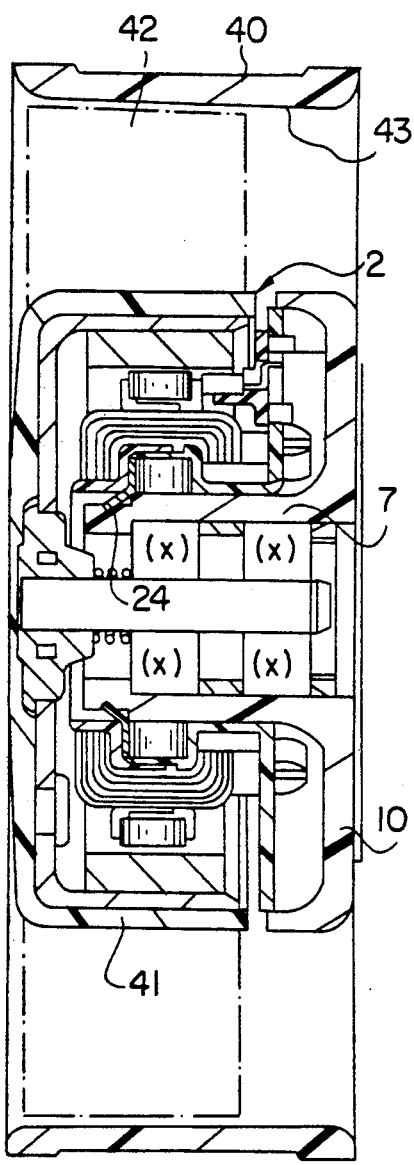
FIG. 4 is a sectional view of an electric motor according to the invention with a mounted stator installed into an axial fan.
Figure 5:
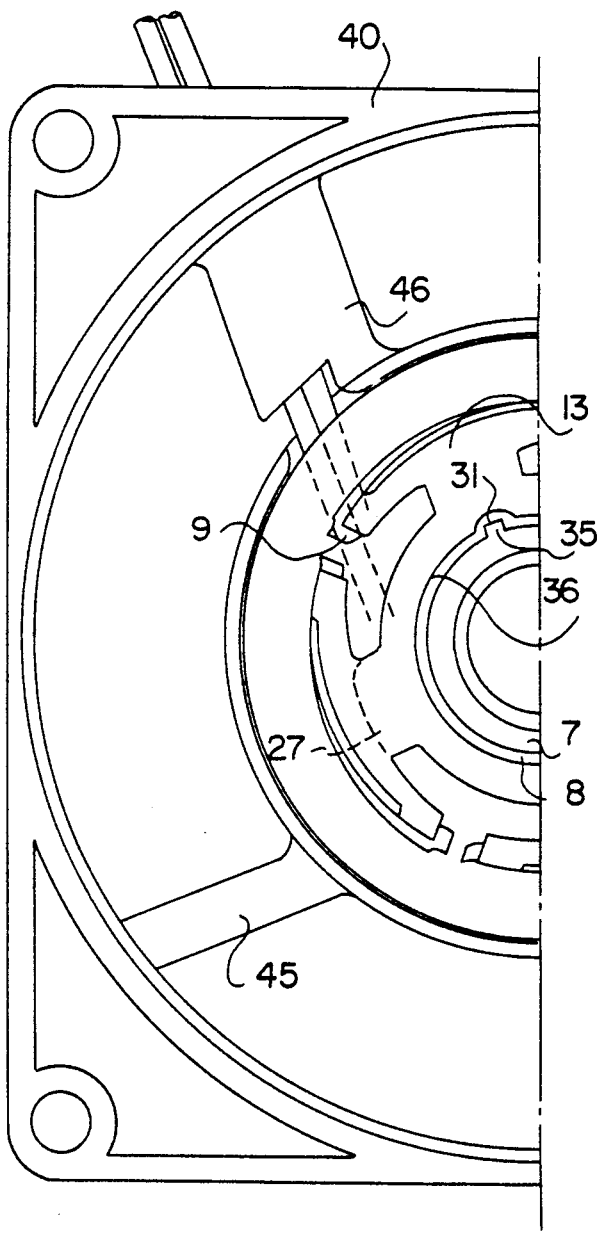
FIG. 5 is half a top view of an axial fan without the rotor.

FIGS. 4 and 5 show a typical fan application of electric motors according to the invention. The axial fan consists of a one-piece plastic injection-molded housing 40 which contains the flange 10, webs 45, 46 and the bearing support part 7. An impeller 41 with blades 42 for moving the air current through a flow duct 43 is mounted on the rotor 2 Such fans are very compact (the representation in these FIGS. 4, 5 is approximately twice the size of the object itself) and as a mass-produced product, are simple and reasonable in price. The stator 3, which previouslY had been mounted by means of gluing, is replaced by the stator 23 which, according to the invention, can be mounted in a simpler and more secure manner. This reduces the costs even more, which is important for this type of a mass-produced product.

When the stator is pressed by a force Fl on the interior area of the bundle of plates of the stator iron core 9, the bundle of plates is bent downward by means of a counterpressure by force F2. During spring-back, the teeth 26 are additionally pressed into the outer jacket 8, eliminating any axial play.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. An electric motor having:
   a fastening flange;
   a bearing support part made of deformable material;
   a rotor surrounding a stator;
   the stator having winding end plates and an iron core axially secured about an outer diameter of the bearing support part at a side facing away from the fastening flange;
   a toothed disk having a central bore surrounding the diameter of the bearing support part and having radially inwardly projecting projection means which are in external contact with the bearing support part to axially fasten the stator to the bearing support part;
   wherein the toothed disk has at least one tongue means protruding beyond an outer edge thereof for connecting and aligning the toothed disk to the stator; and
   wherein the toothed disk is held between a winding end plate and the iron core of the stator by an electrical winding.

2. An electric motor according to claim 1, wherein the radially inwardly projecting projection means of the toothed disk is constructed as pointed teeth.

3. An electric motor according to claim 1, wherein the stator iron core is constructed as a bundle of plates with an axially extending groove in an inside bore of the plates for rotatably securing the plates to the bearing support part.

4. An electric motor according to claim 1, wherein the bearing support part has an axially extending cam means on an outer surface for rotatably securing the stator to the bearing support part.

5. An electric motor according to claim 1, wherein at least three axially extending positioning rib means are arranged on the outer surface of the bearing support part and in parallel to its axis for positioning the bearing support part with respect to the winding plates.

6. An electric motor according to claim 1, wherein at an end of the bearing support part, at the side facing away from the flange, the bearing support part has a short axial area of a smaller diameter.

7. An electric motor according to claim 1, wherein the rotor drives an axial fan,
a housing for the fan including said fastening flange, said bearing support part and a plurality of webs; and wherein
a fan impeller is fastened on said rotor and is mounted centrically in a flow duct of the housing.

8. An electric motor according to claim 2, wherein the pointed teeth are resilient and are flexed by the bearing support part.

9. An electric motor according to claim 8, wherein the bearing support part has a reduced diameter portion to accommodate flexure of the pointed teeth.

10. An electric motor according to claim 1, wherein a support means extends from one of the winding plates to position that winding plate with respect to the fastening flange.

11. An electric motor according to claim 1, wherein a support means extends from one of the winding plates to support an electrical circuit board containing a motor control circuit.

12. An electric motor according to claim 1, wherein one of the winding plates has a radial outer portion that insulatingly covers a portion of the iron core.

13. An electric motor according to claim 1, wherein the stator core is constructed as a bundle of plates, and wherein at least one of these plates has a radial inward portion that is bent axially to provide a force to the projection means of the toothed disk when the toothed disk is held by the winding end plates.

14. An electric motor according to claim 1, wherein reinforcement ribs are located on the winding end plates and wherein the ribs are utilized to receive an external assembly force to assist in the mounting of the winding end plates.

15. An electric motor according to claim 1 wherein radially directed internal ribs are located on an internal surface of the bearing support part for centering the bearing support with respect to a supported bearing.

16. An electric motor according to claim 1, wherein the toothed disk is made of spring steel and has a thickness of approximately 0.1 to 0.3 mm.

17. An electric motor according to claim 16, wherein the radially inwardly projecting projection means of the toothed disk is constructed as pointed teeth.

18. An electric motor according to claim 16, wherein the stator iron core is constructed as a bundle of plates with an axially extending groove in an inside bore of the plates for rotatably securing the plates to the bearing support part.

19. An electric motor according to claim 16 wherein the bearing support part has an axially extending cam means on an outer surface for rotatably securing the stator to the bearing support part.

20. An electric motor according to claim 16 wherein at least three axially extending positioning rib means are arranged on the outer surface of the bearing support part and in parallel to its axis for positioning the bearing support part with respect to the winding plates.

21. An electric motor according to claim 16 wherein at an end of the bearing support part, at the side facing away from the flange, the bearing support part has a short axial area of a smaller diameter.

22. An electric motor according to claim 16 wherein the rotor drives an axial fan,
a housing for the fan including said fastening flange, said bearing support part and a plurality of webs; and wherein
a fan impeller is fastened on said rotor and is mounted centrically in a flow duct of the housing.

23. An electric motor according to claim 17, wherein the pointed teeth are resilient and are flexed by the bearing support part.

24. An electric motor according to claim 23, wherein the bearing support part has a reduced diameter portion to accommodate flexure of the pointed teeth.

25. An electric motor according to claim 16, wherein a support means extends from one of the winding plates to position that winding plate with respect to the fastening flange.

26. An electric motor according to claim 16, wherein a support means extends from one of the winding plates to support an electrical circuit board containing a motor control circuit.

27. An electric motor according to claim 16, wherein one of the winding plates has a radial outer portion that insulatingly covers a portion of the iron core.

28. An electric motor according to claim 16, wherein the stator core is constructed as a bundle of plates, and wherein at least one of these plates has a radial inward portion that is bent axially to provide a force to the projection means of the toothed disk when the toothed disk is held by the winding end plates.

29. An electric motor according to claim 16, wherein reinforcement ribs are located on the winding end plates and wherein the ribs are utilized to receive an external assembly force to assist in the mounting of the winding end plates.

30. An electric motor according to claim 16 wherein radially directed internal ribs are located on an internal surface of the bearing support part for centering the bearing support with respect to a supported bearing.

31. An electric motor having:
a fastening flange;
a bearing support part made of deformable material;
a rotor surrounding a stator;
the stator having winding end plates and an iron core axially secured by a first securement means about an outer diameter of the bearing support part at a side facing away from the fastening flange and comprising plates which are axially secured by a second securement means;
a toothed disk having a central bore surrounding the diameter of the bearing support part and having radially inwardly projecting projection means which are in external contact with the bearing support part to axially fasten the stator to the bearing support part;
wherein the toothed disk has at least one tongue means protruding beyond an outer edge thereof for connecting and aligning the toothed disk to the stator; and
wherein the toothed disk is held between the a winding end plate and the iron core of the stator by the second securement means.

32. An electric motor according to claim 31, wherein the toothed disk is made of metal and has a thickness of approximately 0.1 to 0.3 mm.

* * * * *